US005165348A

United States Patent [19]
Wakabayashi

[11] Patent Number: 5,165,348
[45] Date of Patent: Nov. 24, 1992

[54] CONVEYOR HAVING SELF-PROPELLED CARRIERS AND TRACK WITH PIVOTAL RATCHET PAWL TEETH TO ENSURE SMOOTH TRANSITION BETWEEN FRICTION DRIVE AND PINION DRIVE

[75] Inventor: Takao Wakabayashi, Osaka, Japan

[73] Assignee: Nakanishi Metal Works Co., Ltd., Osaka, Japan

[21] Appl. No.: 876,699

[22] Filed: Apr. 29, 1992

Related U.S. Application Data

[63] Continuation of Ser. No. 559,791, Jul. 30, 1990, abandoned.

[30] Foreign Application Priority Data

Jul. 31, 1989 [JP] Japan ..................... 1-90919[U]

[51] Int. Cl.[5] .............................................. B61C 11/04
[52] U.S. Cl. ..................................... 105/29.1; 238/123
[58] Field of Search ............... 104/165; 105/29.1, 124, 105/127, 128, 153; 238/123; 74/411, 422

[56] References Cited

U.S. PATENT DOCUMENTS

| 349,624 | 9/1886 | Abt ..................... 105/29.1 |
| 569,097 | 10/1896 | Fryer ................. 105/153 X |
| 862,080 | 7/1907 | Levin .................. 105/29.1 |
| 3,429,280 | 2/1969 | Dashew et al. ........ 105/29.1 |
| 3,589,205 | 6/1971 | Radovic ............ 105/29.1 X |
| 4,463,683 | 8/1984 | Uttscheid ............ 105/29.1 |
| 4,563,956 | 1/1986 | Wiechet et al. ...... 105/29.1 |
| 4,644,873 | 2/1987 | Uttscheid ............ 105/29.1 |
| 4,671,183 | 6/1987 | Kjita et al. ............. 104/93 |

FOREIGN PATENT DOCUMENTS 52-97575 8/1977 Japan .

Primary Examiner—Robert J. Oberleitner
Assistant Examiner—S. Joseph Morano
Attorney, Agent, or Firm—Nikaido, Marmelstein, Murray & Oram

[57] ABSTRACT

A conveyor comprising a plurality of self-propelled carriers adapted to run along a rail, which is provided with a rack disposed at a gradient portion thereof and having a plurality of downward teeth. Each of the carriers has a gear meshable with the rack teeth and an electric motor for driving the gear. The rail is provided, at a portion of transit to the portion having the rack, with a plurality of combined ratchet pawls arranged longitudinally of the rail at a specified spacing. Each combined ratchet pawl comprises in combination a forward ratchet pawl movable only forward to escape and mesh with the gear of the carrier, and a rearward ratchet pawl movable only rearward to escape and mesh with the gear.

2 Claims, 15 Drawing Sheets

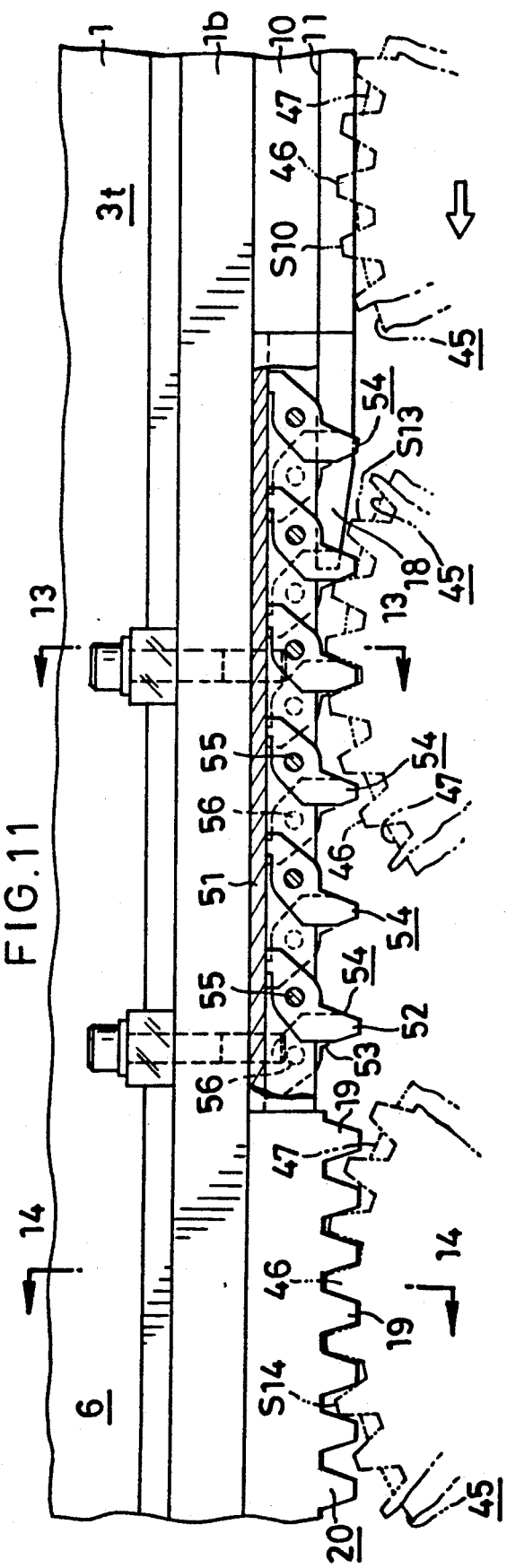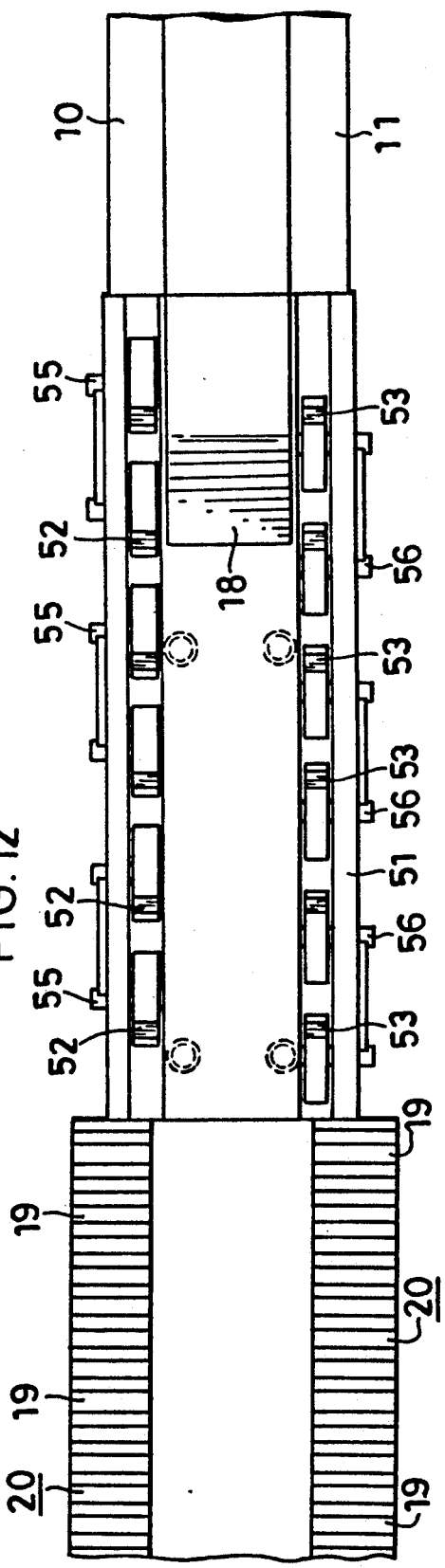

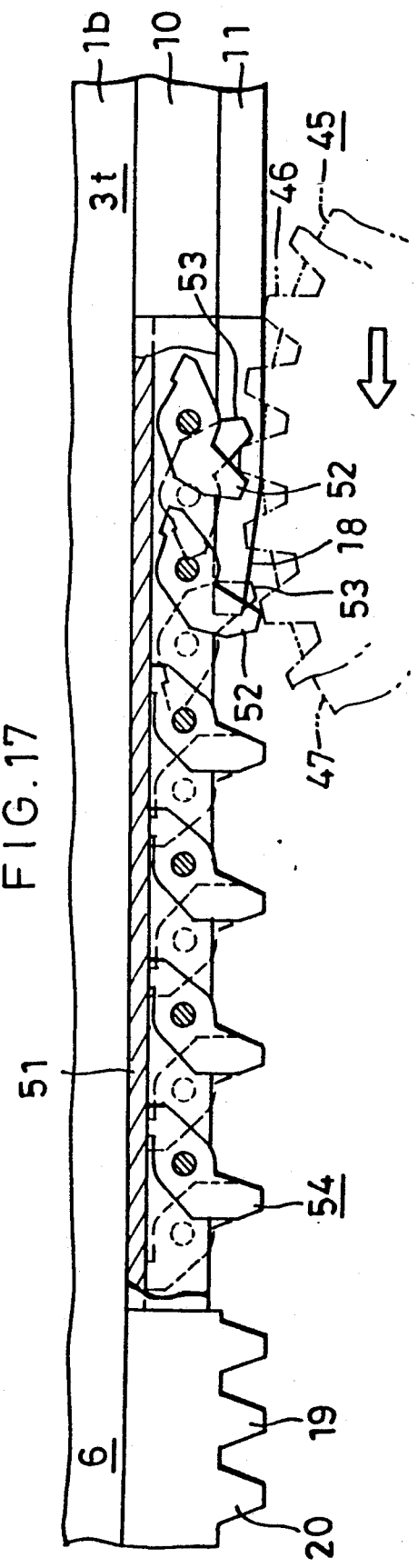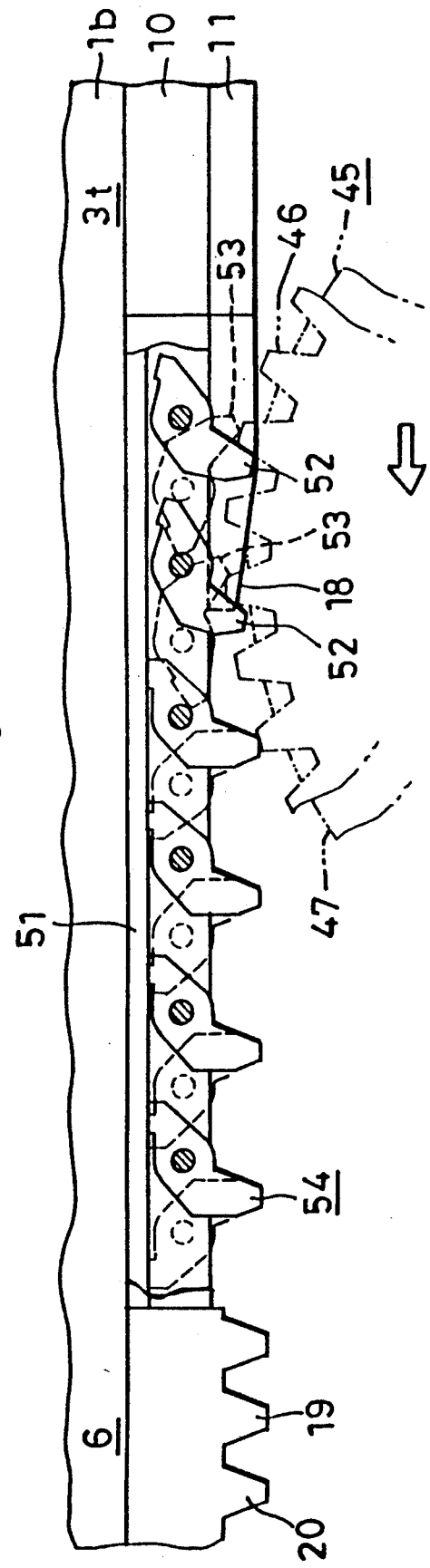

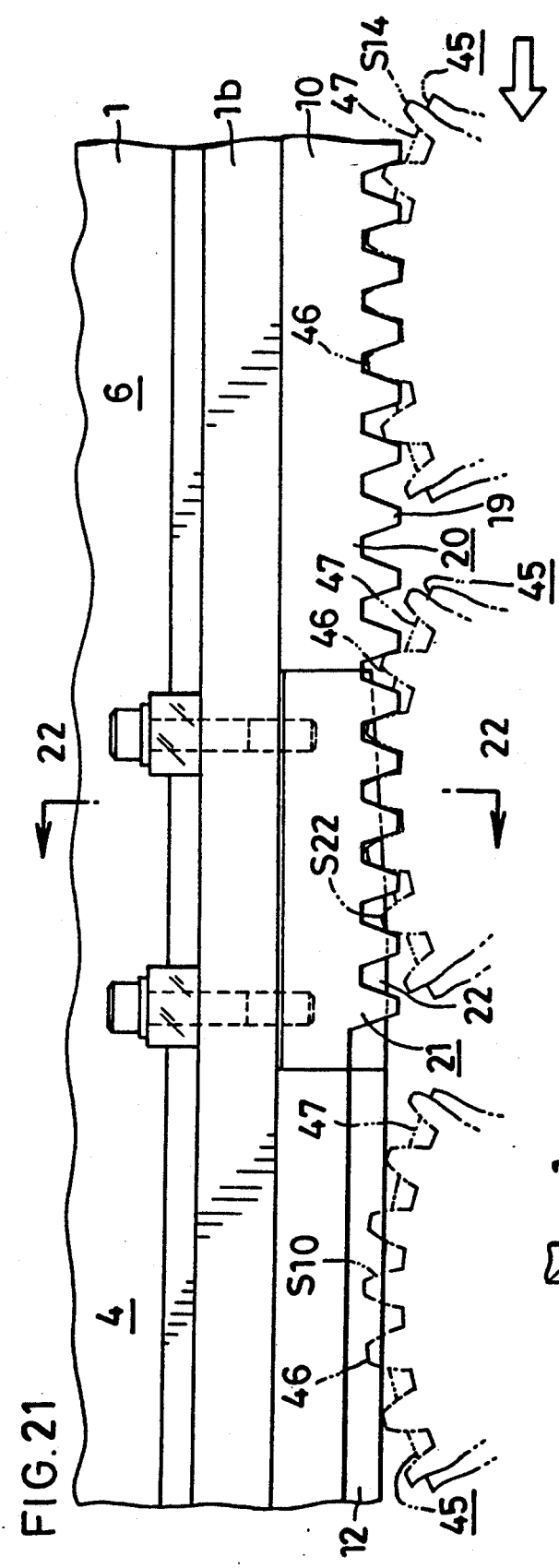
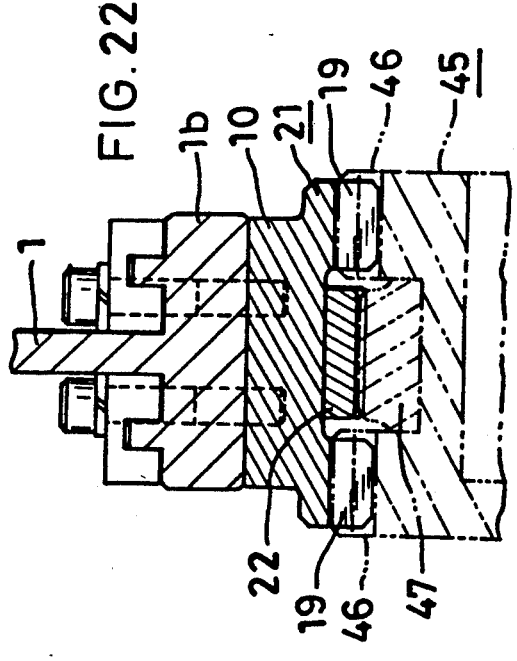

CONVEYOR HAVING SELF-PROPELLED CARRIERS AND TRACK WITH PIVOTAL RATCHET PAWL TEETH TO ENSURE SMOOTH TRANSITION BETWEEN FRICTION DRIVE AND PINION DRIVE

This application is a continuation of U.S. patent application Ser. No. 559,791 filed Jul. 30, 1990 now abandoned.

BACKGROUND OF THE INVENTION

The present invention relates to a conveyor having self-propelled carriers, for example, for use in motor vehicle production lines.

With motor vehicle production lines, a plurality of carriers having vehicle parts (articles to be transported) placed thereon need to be moved through a specified work zone with a constant distance maintained between the carriers. Accordingly, power-and-free trolley conveyors have heretofore been used.

However, the power-and-free trolley conveyor employs chains and therefore has the problem of giving off a great noise and being unable to drive the carriers at a high speed in transport zones or the like other than the work zone.

Accordingly, conveyors having a plurality of self-propelled carriers have been proposed to ensure a reduced noise and to drive the carriers at a higher speed.

The self-propelled carrier of the conventional conveyor has one drive wheel rollable on a rail and one electric motor for driving the wheel.

The conveyor therefore has the problem that when the rail has a gradient, the drive wheel slips at the gradient portion, making the carrier unable to run smoothly.

To overcome this problem, it has been proposed to provide a carrier lift between a high horizontal rail portion and a lower horizontal rail portion without giving the gradient to the rail, or to provide a chain conveyor for the gradient portion to move the carrier with the chain (see Unexamined Japanese Patent Publication SHO 52-97573). However, the lift or chain conveyor needed results in an increased equipment cost.

A conveyor is also proposed wherein a rack having upward teeth is provided at a rail gradient portion, and a pinion mounted on the same shaft as the drive wheel of a carrier is adapted to roll on the rack at the gradient portion (see Examined Japanese Patent Publication SHO 52-97575). However, this arrangement has a problem in respect of strength since a load acts on the pinion at the shaft end of the drive wheel. Further because the pinion as positioned on the rack is subjected to the load of the carrier, the pinion fails to mesh with the rack smoothly, while these members undergo marked abrasion.

Accordingly, we have proposed a conveyor comprising a plurality of self-propelled carriers adapted to run along a rail, the rail having a first drive wheel bearing surface facing upward, a rack provided at a gradient portion of the rail and formed with a plurality of downward teeth, and a friction roller bearing surface facing downward and positioned in the rear of the gradient portion, each of the carriers having a first drive wheel rollable on the first wheel bearing surface of the rail, a first electric motor for driving the first drive wheel, a gear meshable with the rack teeth of the rail, a friction roller positionable in pressing contact with the roller bearing surface from below, and a second electric motor for driving the gear and the friction roller (see U.S. patent Ser. No. 07/466793, EPC90101036.3).

At the rail portion of the conveyor which is not provided with the rack nor with the roller bearing surface, the first electric motor drives the first drive wheel on the wheel bearing surface to cause the carrier to travel at a high speed. In the section where the rail has the roller bearing surface, the second electric motor drives the friction roller in pressing contact with the roller bearing surface to cause the carrier to travel at a low speed. In the section where the rail has the rack, the second electric motor drives the gear in meshing engagement with the rack to cause the carrier to travel at a low speed without slipping. At the rail portion of transit from the portion having the roller bearing surface to the portion having the rack, a roller rack is disposed which has a plurality of rollers arranged along the rail to smoothly bring the gear into meshing engagement with rack teeth. Usually, the gear properly meshes with rollers due to the rotation of the rollers to ride onto the rack, whereas it is likely that the tooth of the gear rides on the top of the roller upon coming into contact therewith. The gear then fails to come into meshing engagement with the roller rack smoothly.

To overcome this problem, it appears useful to replace the roller rack by a plurality of forward ratchet pawls which are arranged along the rail and which are movable only forward to escape but meshable with the gear. Even if the tooth of the gear strikes on the top of the ratchet pawl, the ratchet pawl will escape forward, permitting the gear to smoothly mesh with ratchet pawls. Nevertheless, it is still likely that the gear will be forced forward owing to a reaction by the ratchet pawl, failing to smoothly mesh with the rack.

SUMMARY OF THE INVENTION

The main object of the present invention is to provide a conveyor having self-propelled carriers which is free of all the foregoing problems.

The conveyor of the present invention comprises a plurality of self-propelled carriers adapted to run along a rail, the rail being provided with a rack disposed at a gradient portion thereof and having a plurality of downward teeth, each of the carriers having a gear meshable with the rack teeth of the rail and an electric motor for driving the gear, the rail being provided at a portion of transit to the portion having the rack with a plurality of combined ratchet pawls arranged longitudinally of the rail at a specified spacing, each of the combined ratchet pawls comprising in combination a forward ratchet pawl movable only forward to escape and mesh with the gear of the carrier, and a rearward ratchet pawl movable only rearward to escape and mesh with the gear of the carrier.

At the gradient portion of the rail, the electric motor drives the gear of the carrier in mesh with the rack of the rail to cause the carrier to travel. The carrier therefore runs along the gradient portion without slippage. Upon the carrier reaching the portion of transit to the rail portion where the rack is provided, the tooth of the gear is likely to come into contact with the top of the combined ratchet pawl. The forward ratchet pawl then escapes forward, and the rearward ratchet pawl escapes rearward. Consequently, the gear tooth will not ride onto the ratchet pawl. When teeth of the gear remain out of engagement with ratchet pawls which escape, the gear fails to afford a thrust despite its rotation, so that the carrier slows down in the meantime, assuring the engagement of a gear tooth with the combined ratchet pawl. When the gear tooth meshes with the two component pawls of the combined ratchet pawl at the same time, a forward reaction is delivered to the gear from the forward ratchet pawl, whereas the gear, which is also in mesh with the rearward ratchet pawl, is prevented from being forced forward. The gear advances while reliably meshing with combined ratchet pawls to smoothly ride onto the rack.

With the conveyor of the present invention described, the meshing engagement of the gear with the teeth on the rail causes the carrier to travel along the gradient portion of the rail without slippage, so that the carrier can be prevented from slipping at the gradient portion without necessitating any lift or chain conveyor, hence a reduced equipment cost. During travel with the gear, the gear meshes with the downward teeth of the rail and is not loaded with the weight of the carrier. This ensures smooth engagement of the gear with the rail teeth and serves to diminish the wear on these portions. At the portion of transit to the rail portion where the rack is provided, a plurality of combined ratchet pawls are arranged along the rail at a specified spacing, and each of these combined ratchet pawls comprises the combination of a forward ratchet pawl movable only forward to escape and mesh with the carrier gear and a rearward ratchet pawl movable only rearward to escape and mesh with the gear. This permits the gear to come into smooth meshing engagement with the rack.

The present invention will be described in greater detail with reference to the accompanying drawings.

BRIEF DESCRIPTION OF THE DRAWINGS

FIG. 11 is an enlarged side elevation partly broken away and showing a portion of transit from the first low-speed running portion of the rail to a descent portion thereof;

FIG. 12 is a bottom view of the same;

FIG. 15, FIG. 16, FIG. 17, FIG. 18, FIG. 19 and FIG. 20 are side elevations partly broken away and showing how a gear on the carrier comes into meshing engagement with combined ratchet pawls on the rail in the transit portion of the rail shown in FIG. 11 as the gear advances;

FIG. 21 is an enlarged side elevation showing a portion of the transit from the descent portion of the rail to a low horizontal portion thereof;

FIG. 22 is a view in section taken along the line X22—X22 in FIG. 21; and

DESCRIPTION OF THE PREFERRED EMBODIMENT

Figure 1:
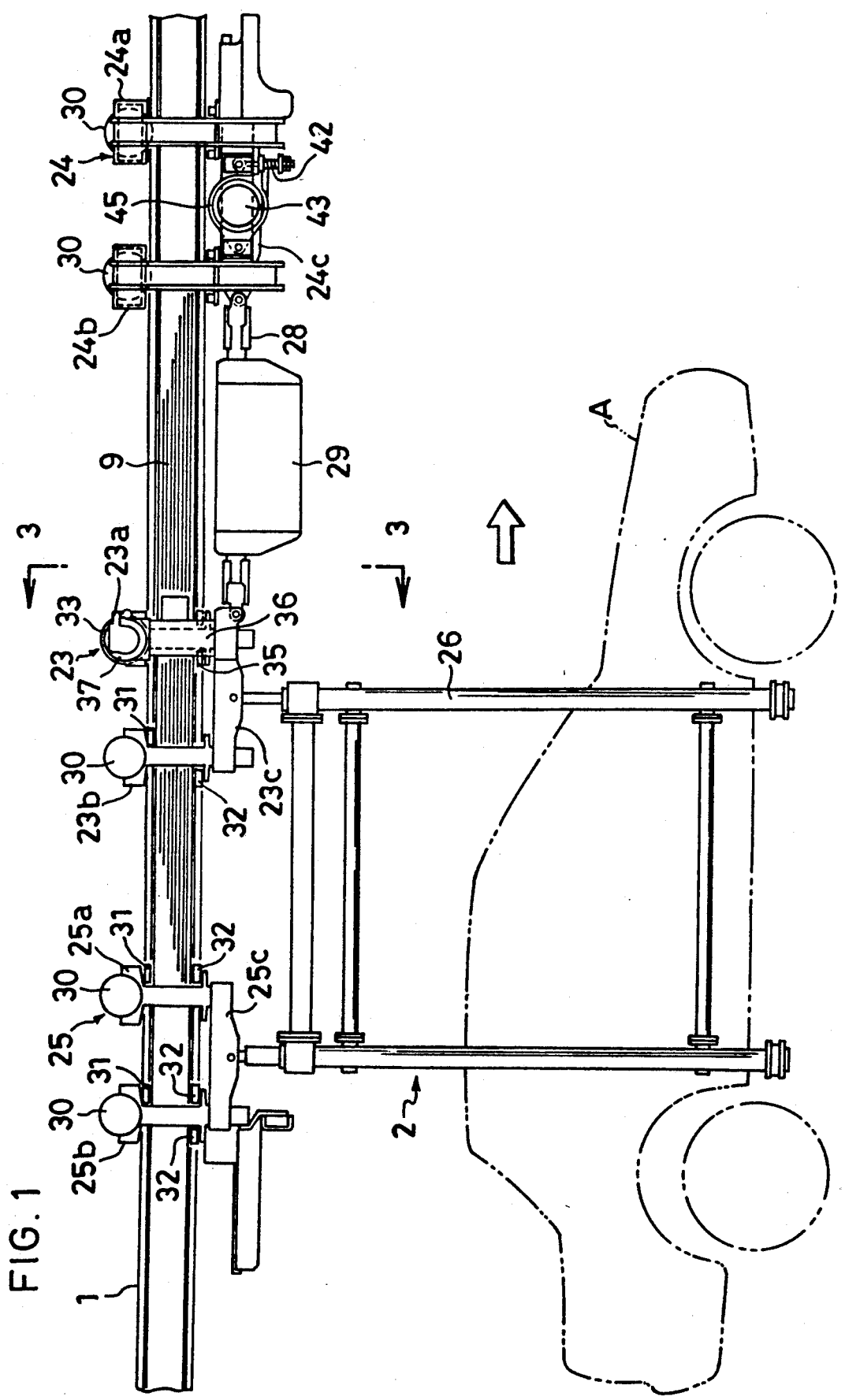
FIG. 1 is a side elevation showing the running rail and self-propelled carrier of a conveyor embodying the invention.
Figure 2:
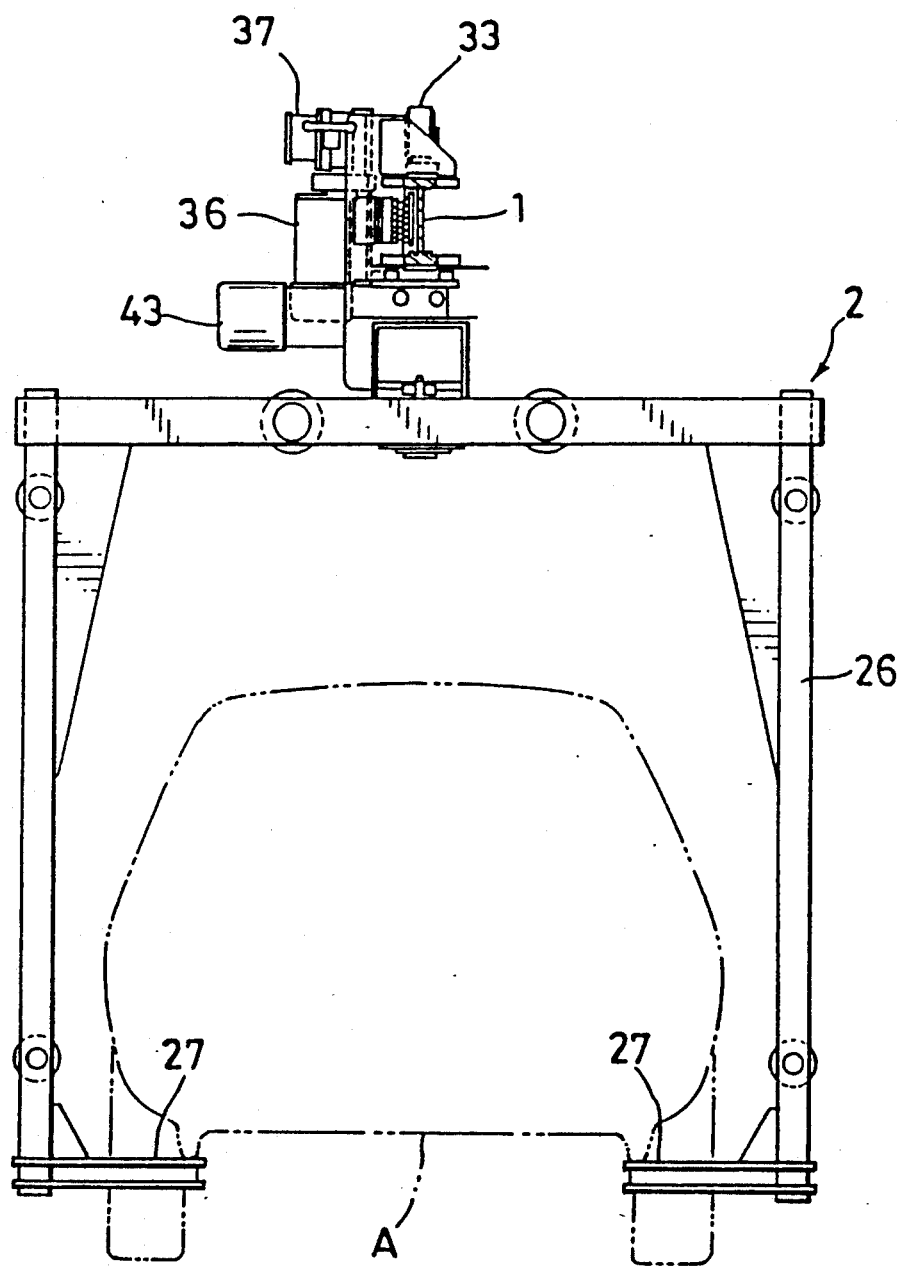
FIG. 2 is a front view of the same.
Figure 23:
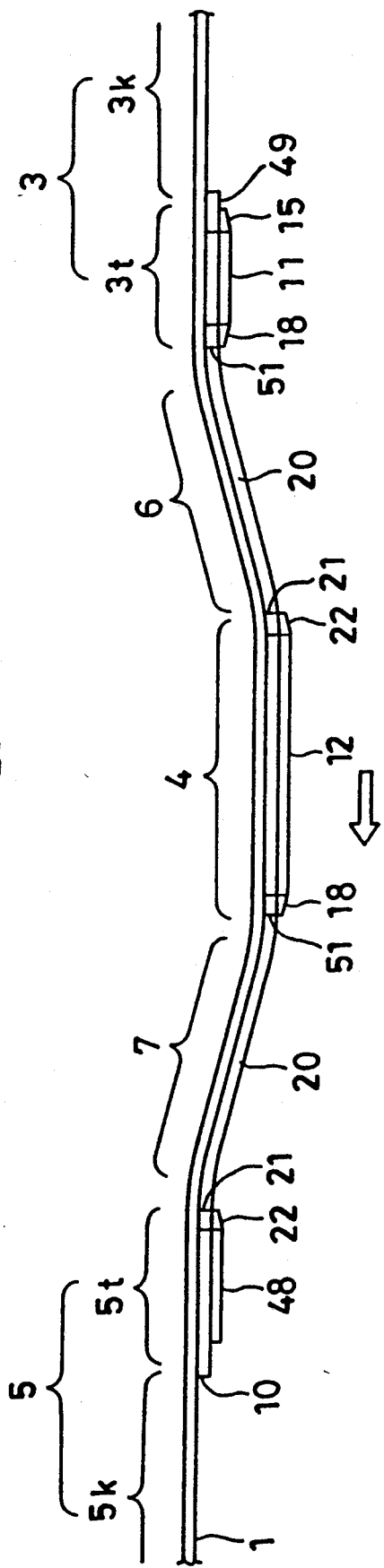
FIG. 23 is a fragmentary side elevation schematically showing the rail.

FIGS. 1 and 2 show an example of running rail 1 of a conveyor provided for a motor vehicle production line and an example of self-propelled carrier 2 thereof. FIGS. 3 to 22 show the same in detail. FIG. 23 is a fragmentary view showing the running rail 1. In these drawings, the direction of advance of the carrier 2 is indicated by arrows. In the following description, the terms "front," "rear," "right" and "left" are used with respect to the direction of advance of the carrier 2.

With reference to FIG. 23, the running rail 1 has a first high horizontal portion 3, a low horizontal portion 4 ahead thereof, and a second high horizontal portion 5 further ahead of the portion 4. A descent portion 6 is provided at a portion of transit from the first high horizontal portion 3 to the low horizontal portion 4, and an ascent portion 7 as a portion of transit from the low horizontal portion 4 to the second high horizontal portion 5. The high horizontal portion 3 is divided into a high-speed running portion (first high-speed running portion) 3k in the rear, and a low-speed running portion (first low-speed running portion) 3t in the front. The second high horizontal portion 5 is divided into a rearward low-speed running portion (second low-speed running portion) 5t and a forward high-speed running portion (second high-speed running portion) 5k.

Figure 3:
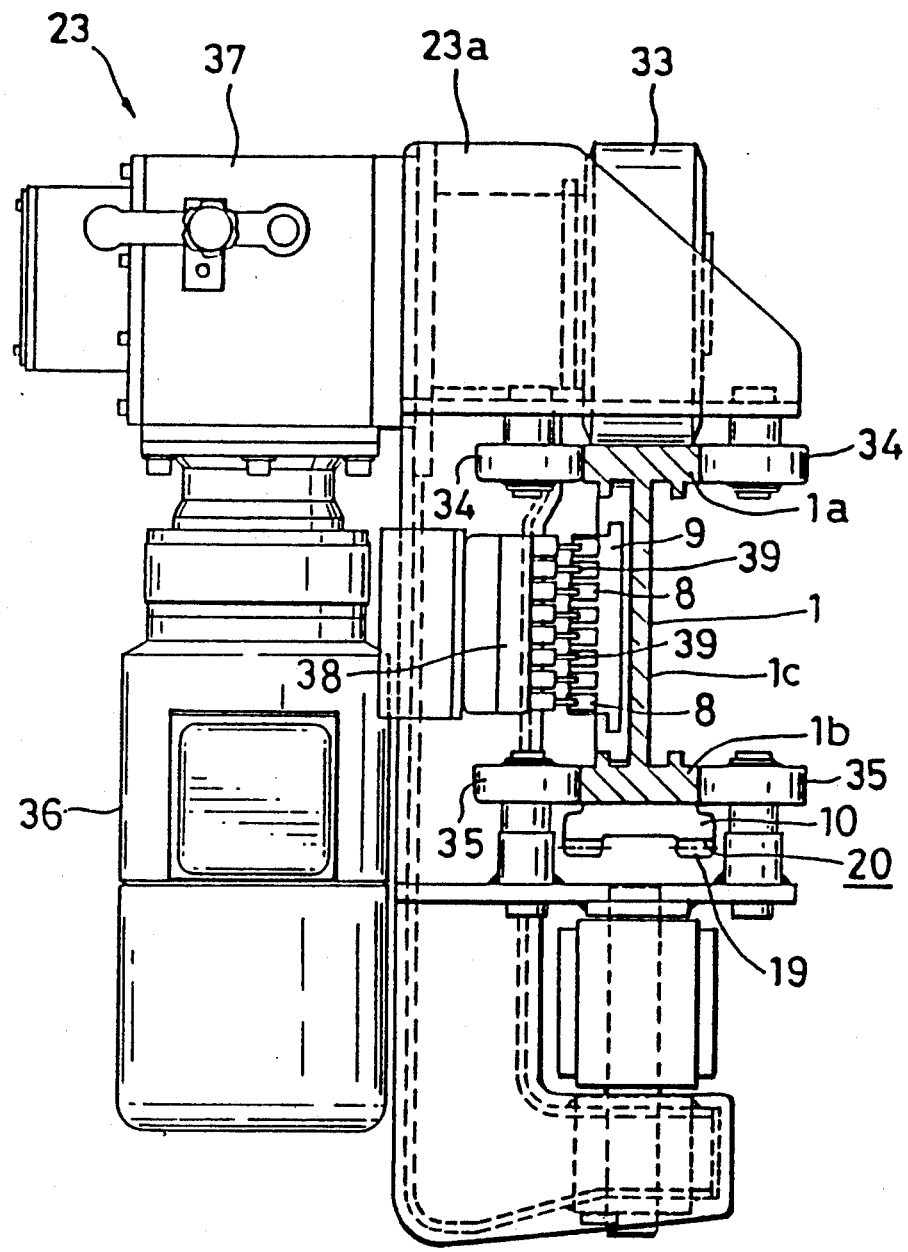
FIG. 3 is an enlarged view in section taken along the line X3—X3 in FIG. 1.
Figure 4:
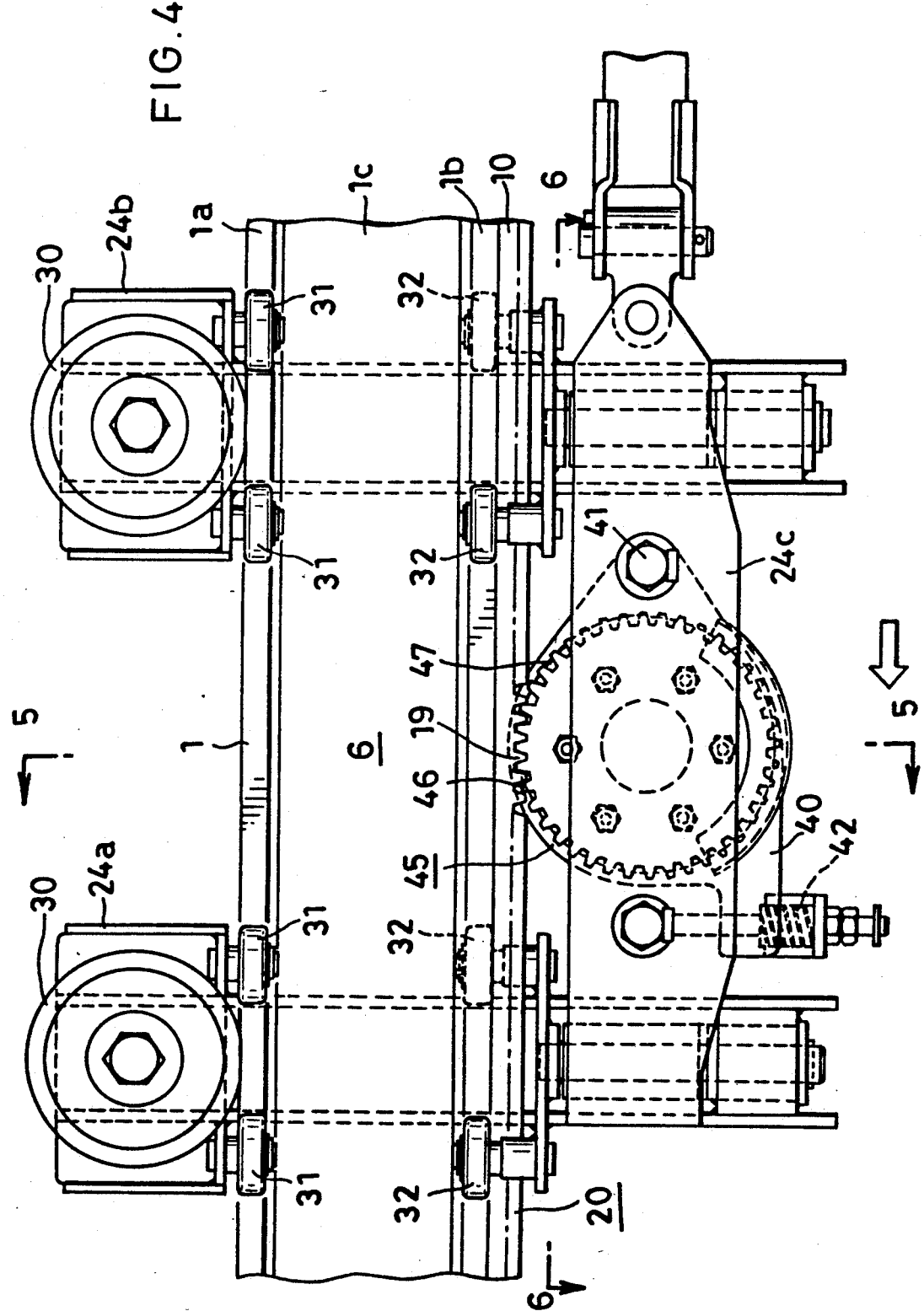
FIG. 4 is an enlarged side elevation of a second drive trolley.
Figure 5:
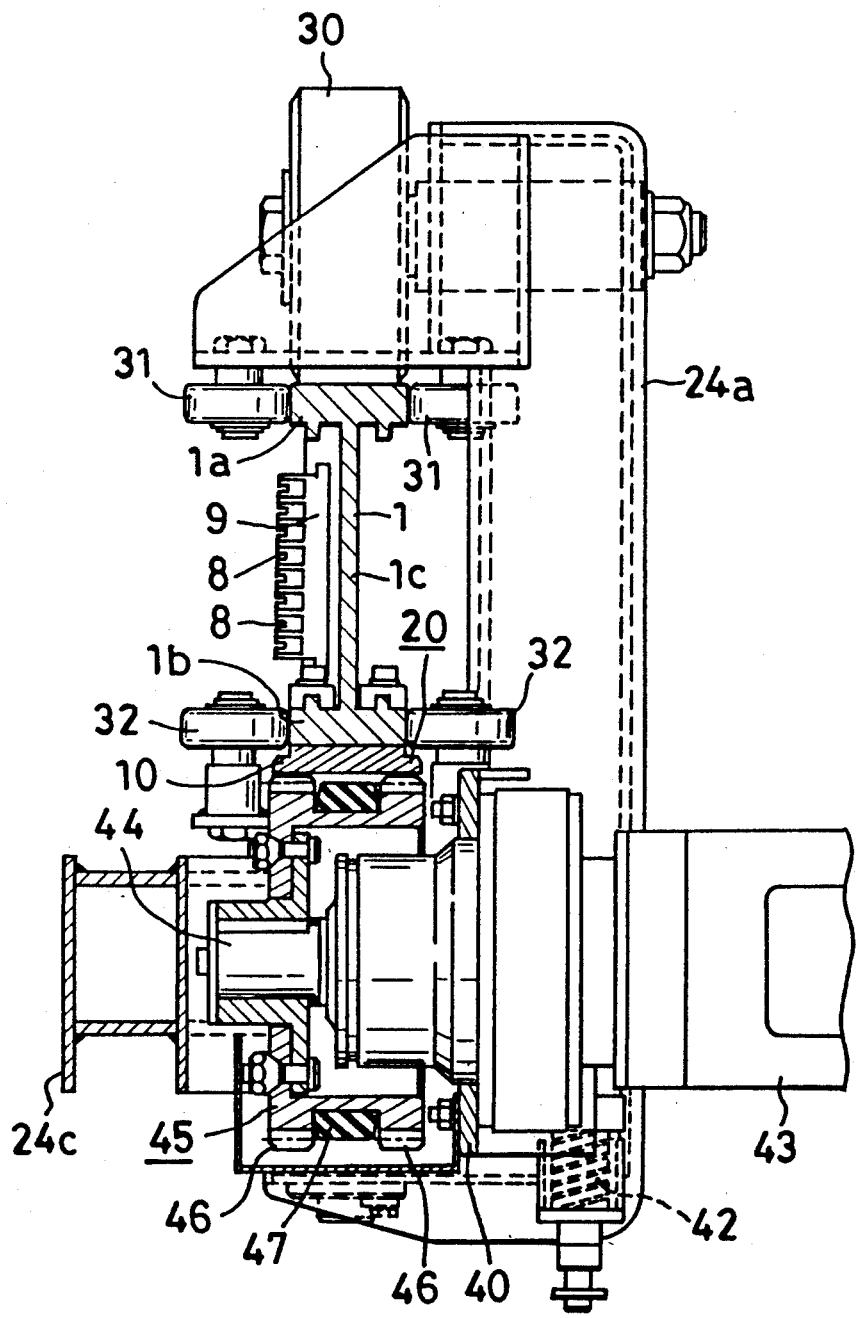
FIG. 5 is a view in section taken along the line X5—X5 in FIG. 4.

As seen in detail in FIGS. 3 to 5, the running rail 1 is I-shaped in cross section and comprises an upper flange 1a, lower flange 1b and web 1c interconnecting the flanges. The running rail 1 is supported at suitable portions by unillustrated support members on the ceiling or the like of a building. On one side of the web 1c of the running rail 1 between the upper and lower flanges 1a, 1b thereof, a power distribution rail 9 is provided which has a plurality of electric wires 8 as arranged one above another.

Figure 7:
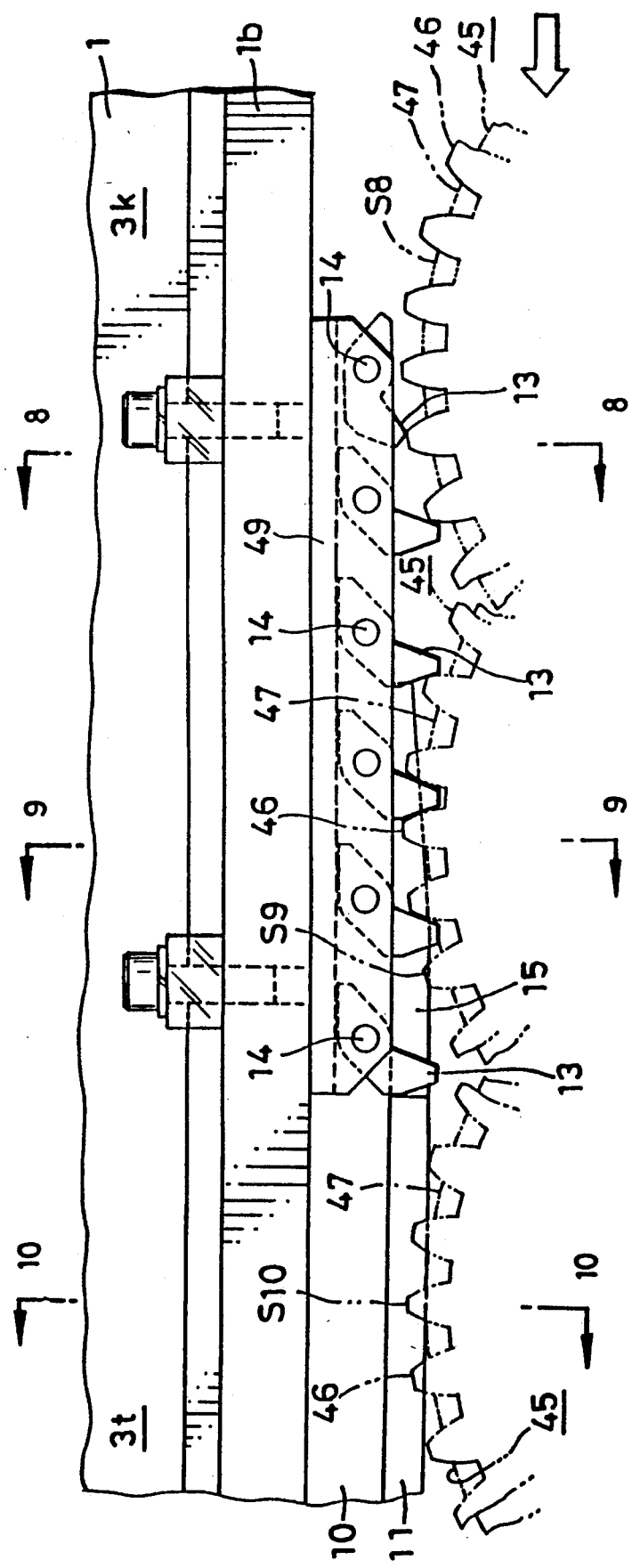
FIG. 7 is an enlarged side elevation of a rail portion of transit from a first high-speed running portion to a first low-speed running portion.
Figure 14:
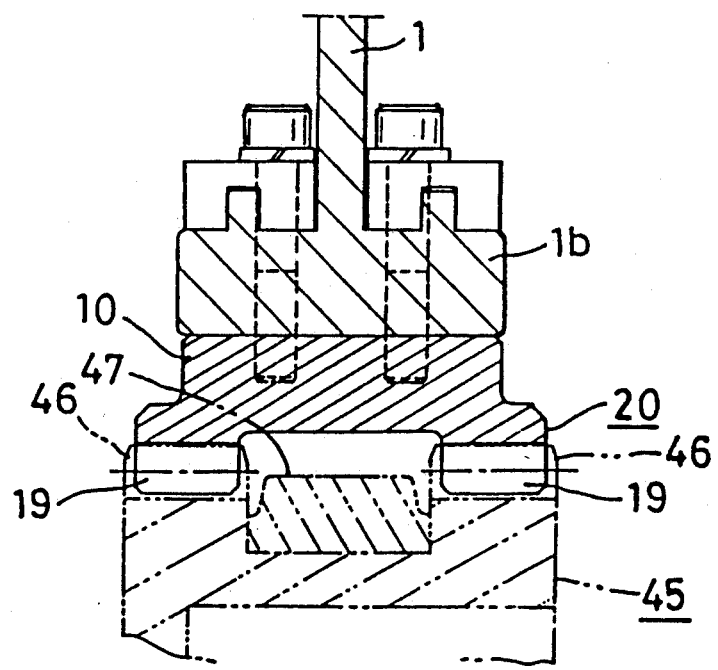
FIG. 14 is a view in section taken along the line X14—X14 in FIG. 11.

FIG. 7 shows the portion of transit from the first high-speed running portion 3k of the rail 1 to the first low-speed running portion 3t, FIG. 11 shows the portion of transit from the first low-speed running portion 3t to the descent portion 6, and FIG. 14 shows the portion of transit from the descent portion 6 to the low horizontal portion 4.

As shown in detail in FIGS. 7 to 22, an auxiliary rail 10 is secured to the underside of the lower flange 1b of the running rail 1 in the first low-speed running portion 3t, descent portion 6, low horizontal portion 4, ascent portion 7 and second low-speed running portion 5t. The auxiliary rail 10 has an approximately rectangular cross section which is elongated transversely of the rail 10. The lower surface of the widthwise midportion of the rail 10 is in parallel to the lower surface of the lower flange 1b.

As shown in detail in FIGS. 7 and 10 to 12, a friction rail 11, rectangular in cross section and having a lower surface as a friction roller bearing surface, is secured to the lower surface of the midportion of the auxiliary rail 10 in the first low-speed running portion 3t. Further as shown in detail in FIG. 21, like friction rail 12 is secured to the midportion lower surface of the auxiliary rail 10 as the low horizontal portion 4. As shown schematically in FIG. 23, like friction rail 48 is also secured to the midportion lower surface of the auxiliary rail 10 at the second low-speed running portion 5t. The friction rails 11, 12, 48 have a definite thickness as measured downward from the lower surface of the auxiliary rail 10.

Figure 8:
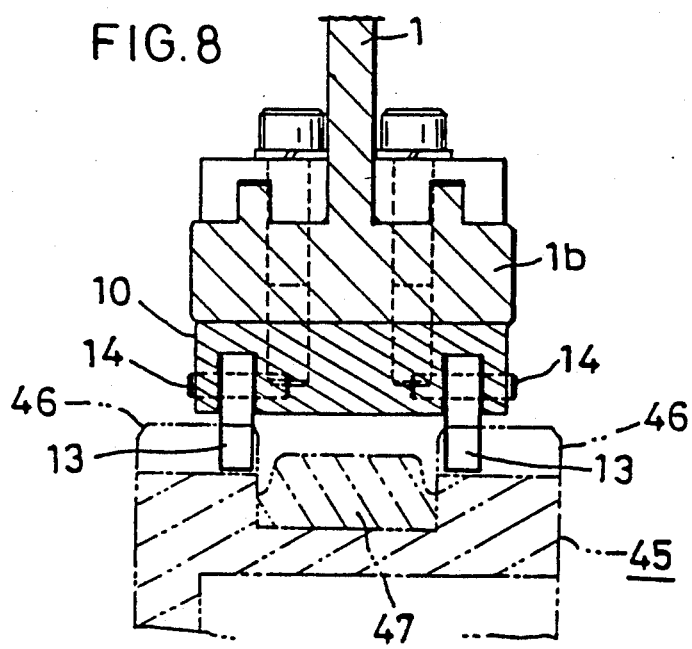
FIG. 8 is a view in section taken along the line X8—X8 in FIG. 7.
Figure 9:
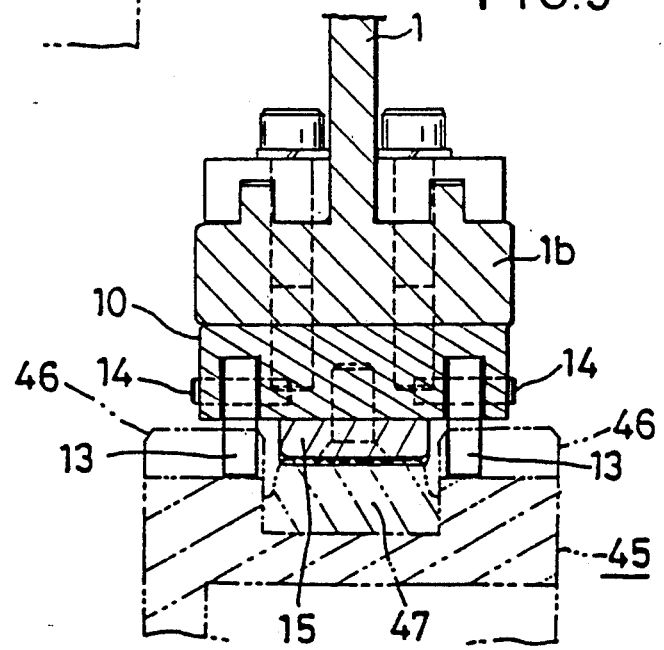
FIG. 9 is a view in section taken along the line X9—X9 in FIG. 7.

As shown in detail in FIGS. 7 to 9, the rear end portion of the auxiliary rail 10 at the transit portion between the first high-speed running portion 3k and the first low-speed running portion 3t provides a first ratchet pawl portion 49. At the right and left opposite sides of this portion 49, a plurality of forward ratchet pawls 13 are supported each by a transverse pin 14 pivotally movably forward or rearward and are arranged at a spacing longitudinally of the rail 10. The ratchet pawls 13 usually hang down under gravity and are at rest as projected downward beyond the lower surface of the rail 10. The pawls 13 in this state will not pivotally move even when a rearward force acts thereon but move forwardly upward when subjected to a forward force. No friction rail is provided beneath the auxiliary rail at the portion where the ratchet pawls 13 are provided. Instead of the friction rail, a wedgelike rail 15 is provided which extends from the rear end of the friction rail 11 at the first low-speed running portion 3t. At the front end, the thickness of the wedgelike rail 15 is equal to that of the friction rail 11 but gradually decreases rearward.

As shown in Detail in FIGS. 11 to 20, the auxiliary rail 10 at the portion of transit from the first low-speed running portion 3t to the descent portion 6 provides a second ratchet pawl portion 51. The second ratchet pawl portion 51 has a plurality of combined ratchet pawls 54 arranged at a spacing longitudinally of the rail. Each combined ratchet pawl 54 comprises in combination a forward ratchet pawl 52 and a rearward ratchet pawl 53. The forward ratchet pawl 52 is mounted on a horizontal transverse pin 55 at one side of the rail 10 so as to be pivotally movable forward and rearward. The rearward ratchet pawl 53 is supported by a horizontal transverse pin 56 on the other side of the rail 10 so as to be pivotally movable forward and rearward. These ratchet pawls 52, 53 are usually at rest, hanging down under gravity and projecting downward beyond the lower surface of the auxiliary rail 10. Like the forward ratchet pawl 13 of the first ratchet pawl portion 49, the forward ratchet pawl 52, while hanging down, will not pivotally move even if subjected to a rearward force but moves forwardly upward when subjected to a forward force. Conversely, the rearward ratchet pawl 53, while hanging down, will not move even if subjected to a forward force but moves rearwardly upward when subjected to a rearward force. While hanging down, the forward ratchet pawl 52 is in coincidence with the rearward ratchet pawl 53 with respect to the longitudinal direction of the rail 10. The pawls 52, 53 in the same position provide a combined ratchet pawl. The two ratchet pawls 52, 53 hanging down and constituting one combined ratchet pawl 54 appear completely superposed when seen from one side, assuming a configuration corresponding to one tooth of a gear. A wedgelike rail 18 continuous with the friction rail 11 is secured to the bottom of midportion of the auxiliary rail 10 in the rear of the second ratchet pawl portion 51. The thickness of the wedgelike rail 18 at its rear end is the same as that of the friction rail 11 and gradually decreases as the rail extends forward.

As seen in greater detail in FIGS. 11, 12, 14 and 21, a rack 20 having downward teeth 19 is formed integrally with the auxiliary rail 10 at opposite sides of the rail at the descent portion 6. The rear end of the rack 20 is continuous with the second ratchet pawl portion 51.

As shown in detail in FIGS. 21 and 22, a short rack 21 similar to and continuous with the rack 20 is formed at opposite sides of the auxiliary rail 10 at the portion of transit from the descent portion 6 to the low horizontal portion 4. A wedgelike rail 22 continuous with the rear end of the friction rail 12 at the low horizontal portion 4 is secured to the midportion lower surface of the auxiliary rail 10, in corresponding relation with the rack 21. The rail 22 is similar to the wedgelike rail 15.

The portion of transit from the low horizontal portion 4 to the ascent portion 7 is similar to the portion of transit from the first low-speed running portion 3t to the descent portion 6. The portion of transit from the ascent portion 7 to the second low-speed running portion 5t is similar to the portion of transit from the descent portion 6 to the low horizontal portion 4.

The carrier 2 has an intermediate first drive trolley 23, a front second drive trolley 24, a rear driven trolley 25, and hangers 26 provided between and suspended from the first drive trolley 23 and the driven trolley 25. The hangers 26 are each provided with a support frame 27 for placing thereon motor vehicle parts or like article A to be transported. The trolleys 23, 24, 25 comprise front frames 23a, 24a 25a and rear frames 23b, 24b, 25b which are suspended from the running rail 1, and frames 23c, 24c, 25c interconnecting the lower portions of the front and rear frames, respectively. The first drive trolley 23 is connected to the second drive trolley 24 by a connecting member 28 in the form of a bar. A controller 29 for controlling the running of the carrier is attached to the connecting member 28. The carrier 2 can be flexed upward, downward, rightward or leftward at the joint portions of the hangers 26 and the connecting member 28.

With reference to FIGS. 4 and 5, each of the rear frame 23b of the first drive trolley 23, the front and rear frames 24a, 24b of the second drive trolley 24, and the front and rear frames 25a, 25b is provided at its upper portion with a vertical driven wheel 30 rollable on the upper surface of the upper flange 1a of the running rail 1, and with opposite upper wheels 31 disposed on opposite sides of the upper flange 1a for preventing horizontal deflection. Each of these frames is further provided at its lower portion with opposite lower wheels 32 arranged on opposite sides of the lower flange 1b of the rail 1 for preventing horizontal deflection.

As shown in detail in FIG. 3, the front frame 23a of the first drive trolley 23 is provided with a vertical first drive wheel 33 rollable on the upper surface of the upper flange 1a of the running rail 1 and has, like the above trolley frames, upper wheels 34 and lower wheels 35 for preventing horizontal deflection. A first electric motor 36 for high-speed running is attached as directed upward to one side of the front frame 23a and is coupled to the first drive wheel 33 by a clutch assembly 37, which although not shown, includes a clutch and a brake. The front frame 23a is provided with a current collector 38 opposed to the power distribution rail 9. The collector 38 has a plurality of collector members 39 arranged one above another and held in sliding contact with the respective electric wires 8 by suitable known means. Power and control signals are fed to the controller 29 from the electric wires 8 via the collector members 39.

Figure 6:
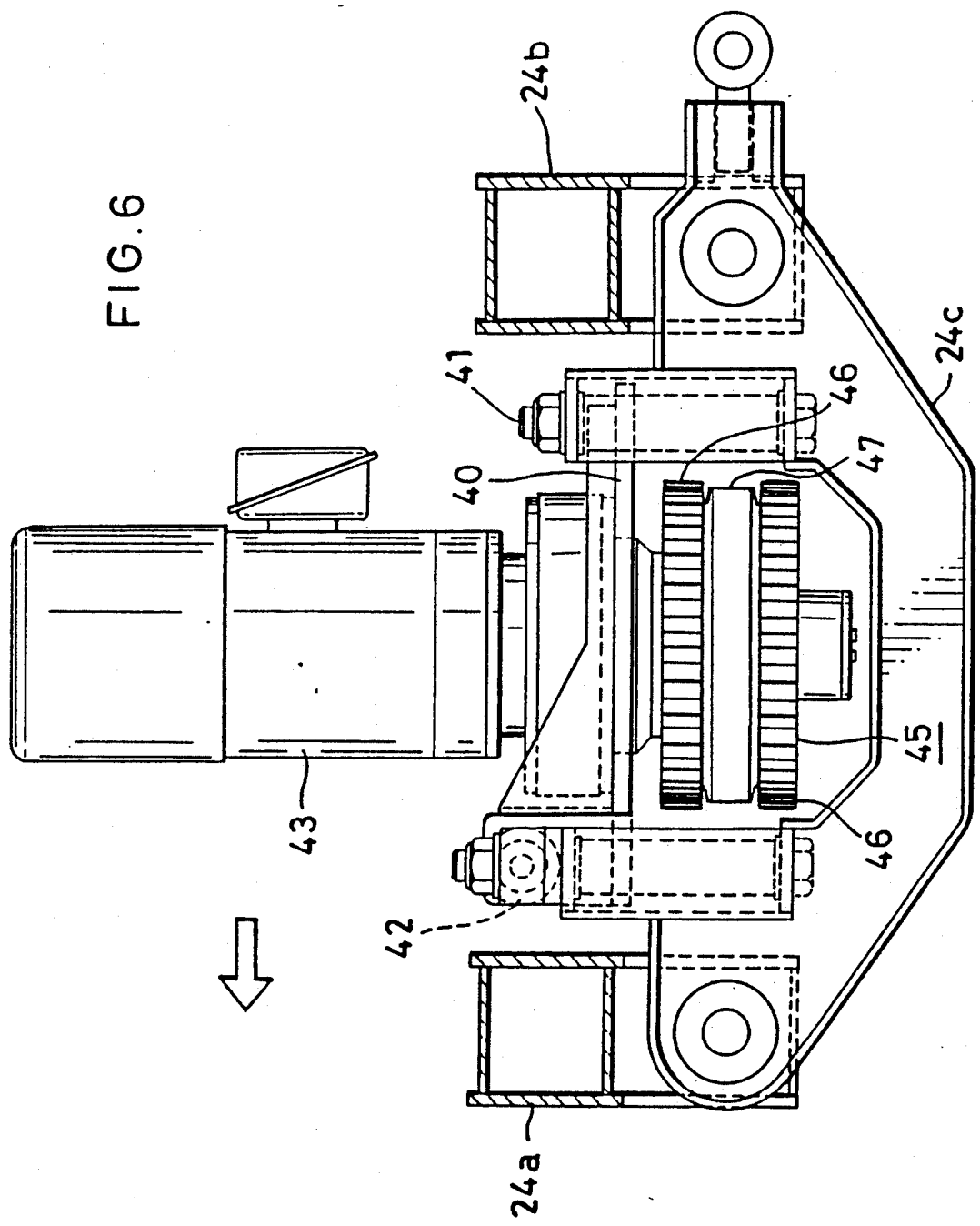
FIG. 6 is a view in section taken along the line X6—X6 in FIG. 4.

With reference to FIGS. 4 to 6, a bracket 40 is attached to the connecting frame 24c of the second drive trolley 24. The bracket 40 is pivotally movable upward or downward within a given range about a transverse horizontal pin 41 and is biased upward by a spring 42. The bracket 40 has attached thereto a second electric motor 43 for running at a low speed and at the gradient portions. This motor 43 is disposed horizontally transversely of the running rail 1 and has a second drive wheel 45 secured to its motor shaft 44. The drive wheel 45 is integrally formed at its opposite sides with gears 46 having a larger diameter than the other portion of the wheel 45 and has fixed to the midportion of its outer surface a friction roller 47. The friction roller 47 is adapted to be pressed into contact with the lower surface of the friction rails 11, 12 by the spring 42. At the portions where the friction rails 11, 12 are absent, the friction roller 47 will not contact the auxiliary rail 10 even if the bracket 40 is pivotally moved to its upper limit position. The pitch of teeth 19 of the racks 20, 21 is equal to that of the teeth of the gears 46. The pitch of the ratchet pawls 13 and the combined ratchet pawls 54 is the pitch of teeth of the gears 46 multiplied by an integer, e.g., twice the latter pitch. Further wherever the bracket 40 is positioned, the gears 46 will not interfere with the friction rails 11, 12, but are meshable with the ratchet pawls 13, 52, 53 and the teeth 19 of the racks 20, 21.

With the conveyor described above, the first drive wheel 33 causes the carrier 2 to run at a high speed at the first high-speed running portion 3k and the second high-speed running portion 5k. The second drive wheel 45 drives the carrier at a low speed at the first low-speed running portion 3t, descent portion 6, low horizontal portion 4, ascent portion 7 and second low-speed running portion 5t.

This will be described in order in detail.

At the first high-speed running portion 3k, the second motor 43 is at rest, and the first motor 36 is driven, with the clutch assembly 37 therefor engaged. Consequently, the first drive wheel 33 is driven, causing the carrier to run along the rail 1.

Figure 10:
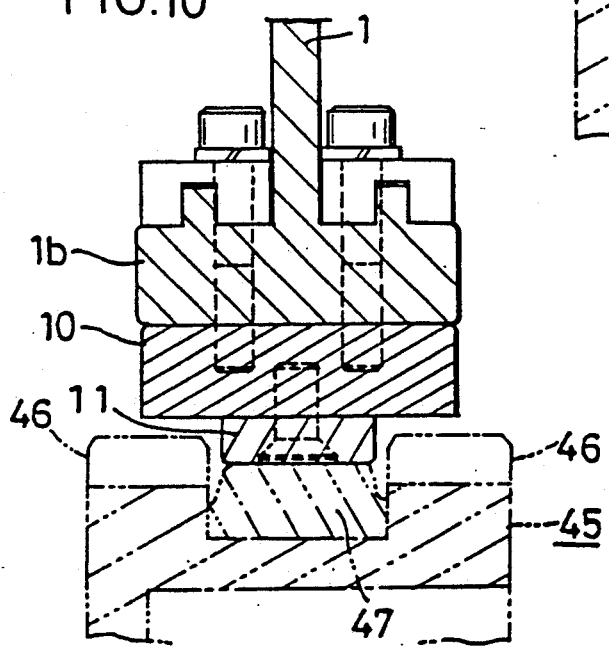
FIG. 10 is a view in section taken along the line X10—X10 in FIG. 7.

When the carrier 2 in this state reaches the portion of transit to the first low-speed running portion 3t, the gears 46 of the second drive wheel 45 collide with ratchet pawls 13 as indicated in a phantom line S8 in FIG. 7 and as shown in FIG. 8. Upon the collision of the gears 46, these pawls 13 pivotally move forwardly upward and escape, but upon the passage of the colliding teeth of the gears 46, the pawls 13 hand down again under gravity. When the second drive wheel 33 reaches the portion of ratchet pawls 13, the first motor 36 stops, and the clutch assembly 37 is disengaged, rendering the first drive wheel 33 free. At the same time, the second motor 43 is brought into rotation. The second drive wheel 45 therefore rotates clockwise in FIG. 7, permitting the gears 46 to mesh with ratchet pawls 13, whereby the gears 46 are subjected to a forward force to thereby advance the carrier 2. When the carrier 2 has advanced to an extent, the friction roller 47 on the second drive wheel 45 comes into contact with the lower surface of an intermediate portion of the wedgelike rail 15 as indicated in a phantom line S9 in FIG. 7 and as shown in FIG. 9. The meshing engagement of the gears 46 with ratchet pawls 13 further advances the carrier 2, with the friction roller 47 in contact with the wedgelike rail 15. Eventually, the friction roller 47 leaves the rail 15 and comes into contact with the friction rail 11, while the gears 46 leave the ratchet pawls 13 as indicated in a phantom line S10 in FIG. 7 and as shown in FIG. 10. The carrier 2 runs along the running rail 1 at the low speed in this state by virtue of the rotation of the friction roller 47.

In the above mode of running, the ratchet pawls 13 provided serve to mitigate the impact resulting from the collision of the gears 46, while the meshing engagement of the gears 46 with the ratchet pawls 13 advances the second drive wheel 45 to properly bring the friction roller 47 into contact with the friction rail 11. Since the friction roller 47 is driven by the low-speed running second motor 43, there is no likelihood of the drive torque becoming insufficient.

Figure 13:
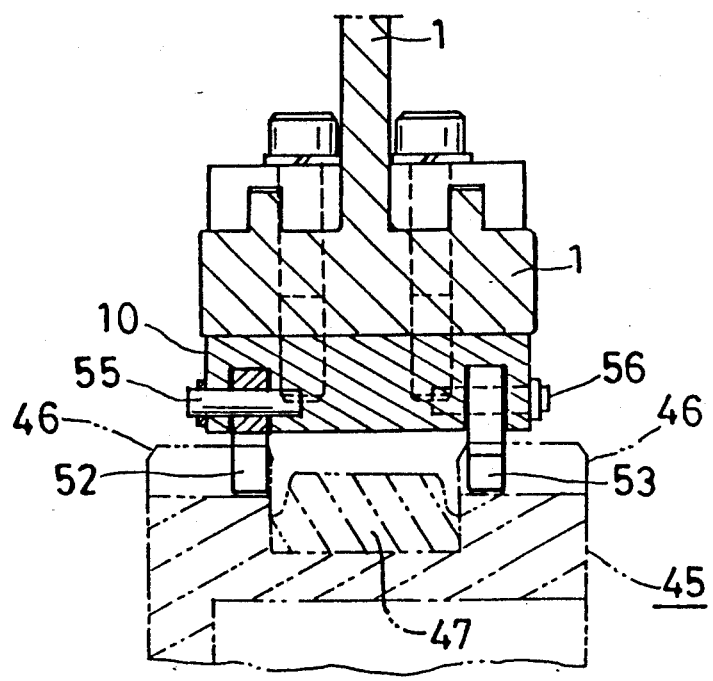
FIG. 13 is a view in section taken along the line X13—X13 in FIG. 11.

Upon the carrier 2 reaching the portion of transit to the descent portion 6 after running along the first low-speed running portion 3t, the friction roller 47 on the second drive wheel 45 moves from the friction rail 11 to the wedgelike rail 18, and the gears 46 start to mesh the combined ratchet pawl 54 of the second ratchet pawl portion 51. Thus, as indicated in a phantom line S13 in FIG. 11 and as shown in FIG. 13, the friction roller 47 leaves the wedgelike rail 18, and the gears 46 come into meshing engagement with the combined ratched pawls 54 and subsequently mesh with the rack 20. The engagement of the gears 46 with the rack 20 causes the carrier 2 to run at a low speed along the running rail 1 at the descent portion 6 as indicated in a phantom line S14 in FIG. 11 and as shown in FIG. 14.

In the above process, the second ratchet pawl portion 51 provided upstream from the rack 20 permits the gears 46 to mesh with the rack 20 smoothly as will be described in detail below. Further since the meshing engagement of the gears 46 with the rack 20 drives the carrier 2 along the descent portion 6, the carrier 2 is unlikely to slip. The gears 46 mesh with the downward teeth of the rack 20, while the first drive wheel 33 and the driven wheel 30 bear the weight of the carrier 2. This assures smooth engagement between the gears 46 and the rack 20 and diminishes the wear that would occur.

Next with reference to FIGS. 15 to 20, a description will be given of how the gears 46 of the carrier 2 come into meshing engagement with the ratchet pawls 52, 53 of the second ratchet pawl portion 51.

Figure 15:
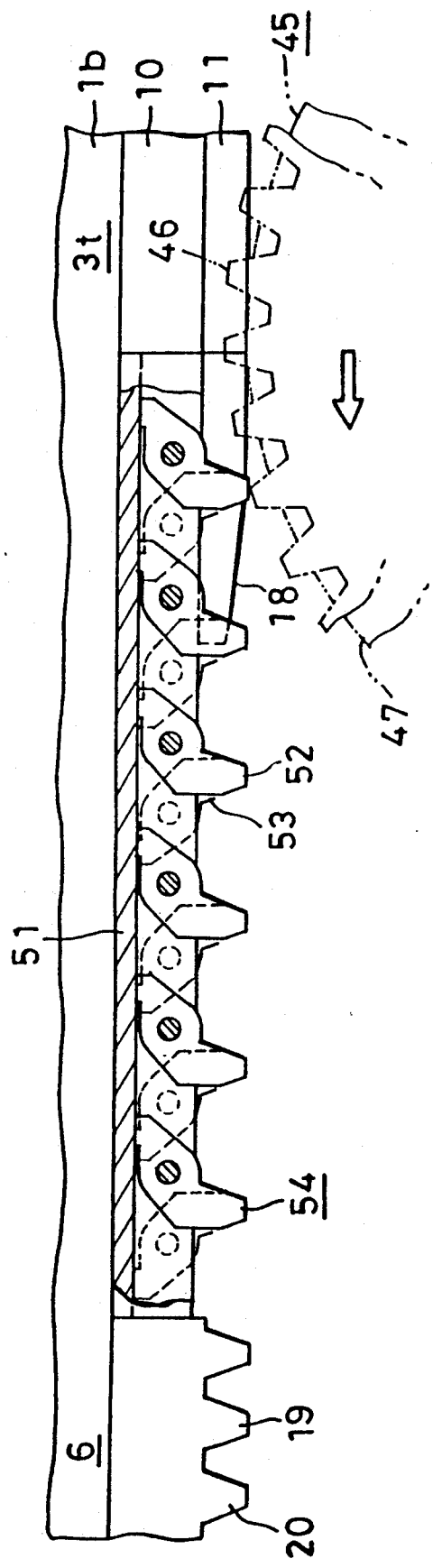
Figure 16:
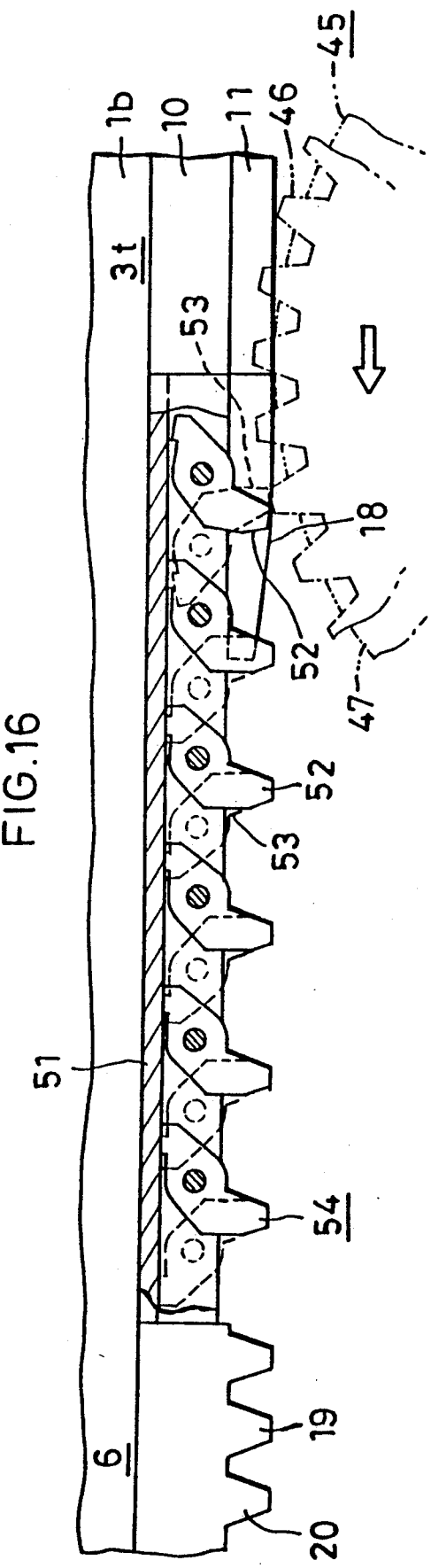
Figure 19:
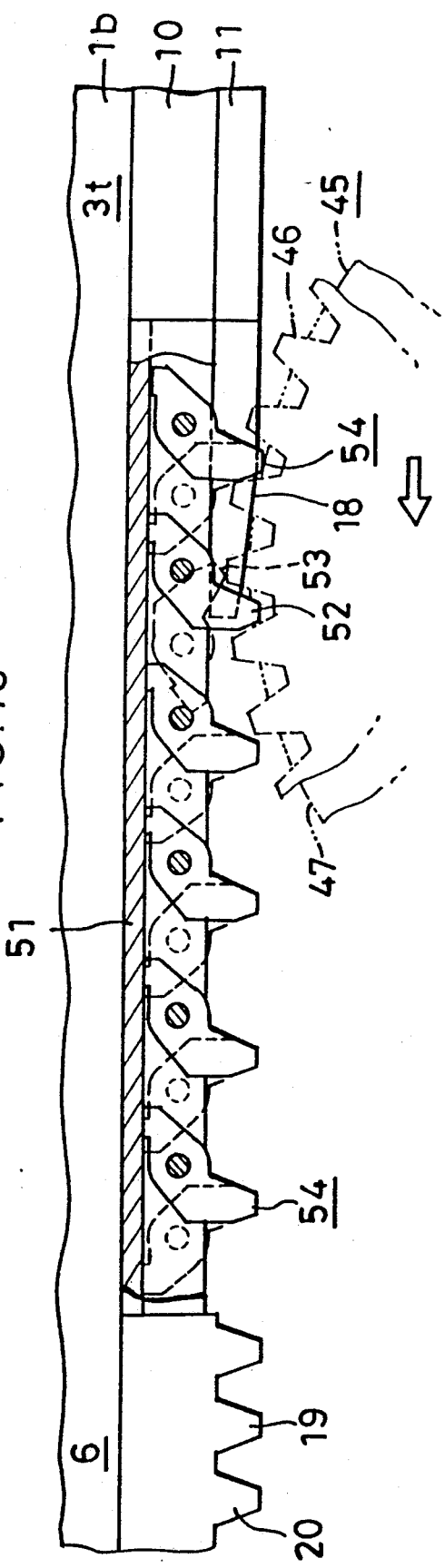

FIG. 15 shows the carrier 2 upon reaching the second ratchet pawl portion 51, with teeth of the gears 46 in contact with the top portions of the respective ratchet pawls 52, 53 in the rearmost position. When teeth of the gears 46 thus come into contact with the top portions of the respective ratchet pawls 52, 53, the forward ratchet pawl 52 escapes forward, while the rearward ratchet pawl 53 escapes rearward as seen in FIG. 16. With the advance of the gears 46 in rotation, these pawls 52, 53 further greatly escape as seen in FIG. 17. At this time, forward teeth of the gears 46 contact the top portions of the ratchet pawls 52, 53 in the second position from the rear, permitting these pawls 52, 53 to similarly escape forward and rearward. With further advance of the gears 46, the forward ratchet pawl 52 in the rearmost position returns almost to the hanging-down position as shown in FIG. 18. Subsequently, this forward pawl 52 returns to the hanging-down position, and the forward pawl 52 in the second position from the rear also returns to the hanging-down position as shown in FIG. 19.

Figure 20:
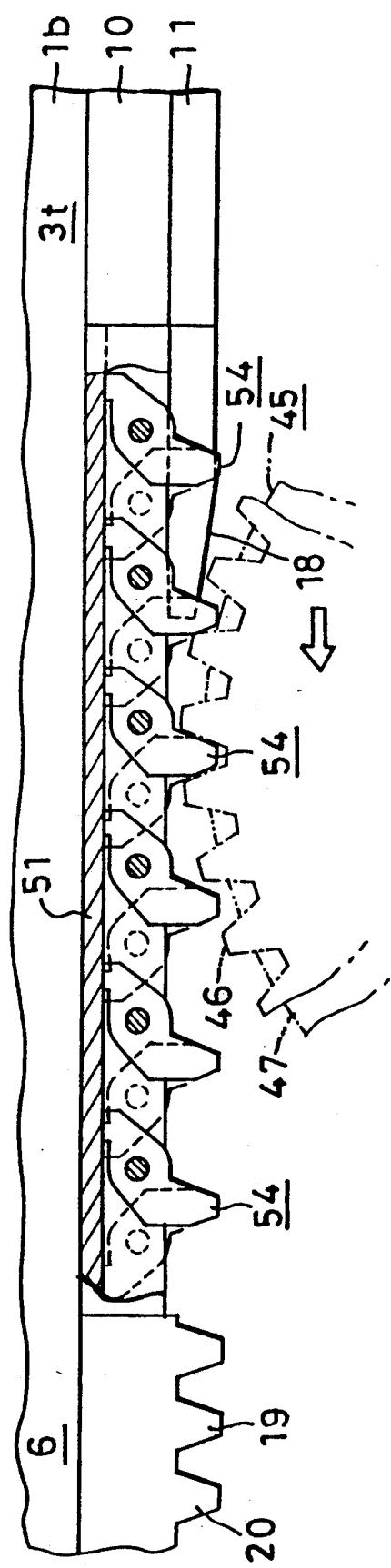

These pawls deliver a forward propelling force to the gears 46. By this time, the rearward ratchet pawl 53 in the rearmost position has already returned to the hanging-down position, and the rearward pawl 53 in the second position from the rear subsequently returns to the same position. Consequently, the gears 46 mesh with the respective two ratchet pawls 52, 53 in the second position from the rear and properly mesh with the two rachet pawls 52, 53 hanging down and in the third position from the rear as seen in FIG. 20. When the gears 46 mesh with two ratchet pawls 52, 53 at the same time, the forward pawl 52 delivers a forward reaction to the gears 46, which nevertheless are not forced forward owing to the engagement with the rearward pawl 53. The gears 46 thereafter advance while properly meshing with the ratchet pawls 52, 53 which are positioned ahead to eventually come into proper engagement with teeth 19 of the rack 20 to advance along the rack.

Thus, even if teeth of the gears 46 first contact the top portions of ratchet pawls 52, 53, these pawls 52, 53 escape forward and rearward without allowing the gear teeth to ride onto the pawls 52, 53. When teeth of the gears 46 remain out of engagement with ratchet pawls 52, 53 due to the escape thereof, no thrust is obtained despite the rotation of the gears 46, so that the carrier 2 slows down in the meantime, permitting teeth of the gears 46 to properly mesh with the combined ratchet pawl 54. The combined ratchet pawls 54 function to enable the gears 46 to smoothly mesh with the rack 20.

Upon the carrier 2 reaching the portion of transit to the low horizontal portion 4 after running along the descent portion 6, the friction roller 47 comes into contact with the wedgelike rail 22, and the gears 46 mesh with the rack 21 as indicated in a phantom line S22 in FIG. 21 and as seen in FIG. 22. This enables the friction roller 47 to leave the rail 22 and come into contact with the friction rail 12 properly. As is the case with the first low-speed running portion 3t, the friction roller 47 causes the carrier 2 to run at a low speed.

The carrier travels along the portion of transit from the low horizontal portion 4 to the ascent portion 7 in the same manner as already described with reference to FIGS. 11 to 20.

At this time, the meshing engagement of the gears 46 with the rack 20 causes the carrier 2 to run along the ascent portion 7. This prevents the carrier 2 from slipping.

The carrier travels along the portion of transit from the ascent portion 7 to the second low-speed running portion 5t in the same manner as already described with reference to FIGS. 21 and 22.

Upon the carrier 2 reaching the portion of transit to the second high-speed running portion 5k after running along the second low-speed running portion 5t, there is no friction rail 48 for the roller 47 to roll on, and the second motor 43 stops. At this time, the first motor 36 is driven, and the clutch assembly 37 is engaged. The first drive wheel 33 therefore rotates, causing the carrier 2 to travel along the second high speed-running portion 5k.

Although the carrier 2 is adapted to run at a low speed along the entire low horizontal portion 4 according to the embodiment described, this portion 4 may be divided into a low-speed running portion at each end and an intermediate high-speed running portion

What is claimed is:

1. A conveyor system comprising:
   a single guide rail:
   a plurality of self-propelled carriers which move along said rail;
   a rack fixed to said rail and disposed at a gradient portion thereof, said rack having a plurality of downward teeth,
   wherein each of the carriers includes
   a) a gear meshable with the rack teeth of the rail, and
   b) an electric motor for driving the gear;
   said conveyor system further comprising:
   a plurality of combined ratchet pawls arranged longitudinally with respect to the rail at a specified spacing, said ratchet pawls being adjacent to a portion of the rail having the rack disposed thereon,
   wherein each of the combined ratchet pawls includes a forward ratchet pawl comprising a single tooth pivotably movable only in a direction to escape and mesh with the gear of the carrier, and a rearward ratchet pawl comprising a single tooth pivotably movable only in an opposite direction from said forward ratchet pawl to escape and mesh with the gear of the carrier and wherein each of said ratchet pawls engages only one tooth of the gear at any given time.

2. A conveyor system according to claim 1, wherein said guide rail further comprises power distribution means for distributing electrical power to said carriers.

* * * * *